July 18, 1967  F. G. EAST  3,331,491
BELT POSITIONING APPARATUS FOR GROOVED CONVEYORS
Filed Aug. 23, 1965  2 Sheets-Sheet 1
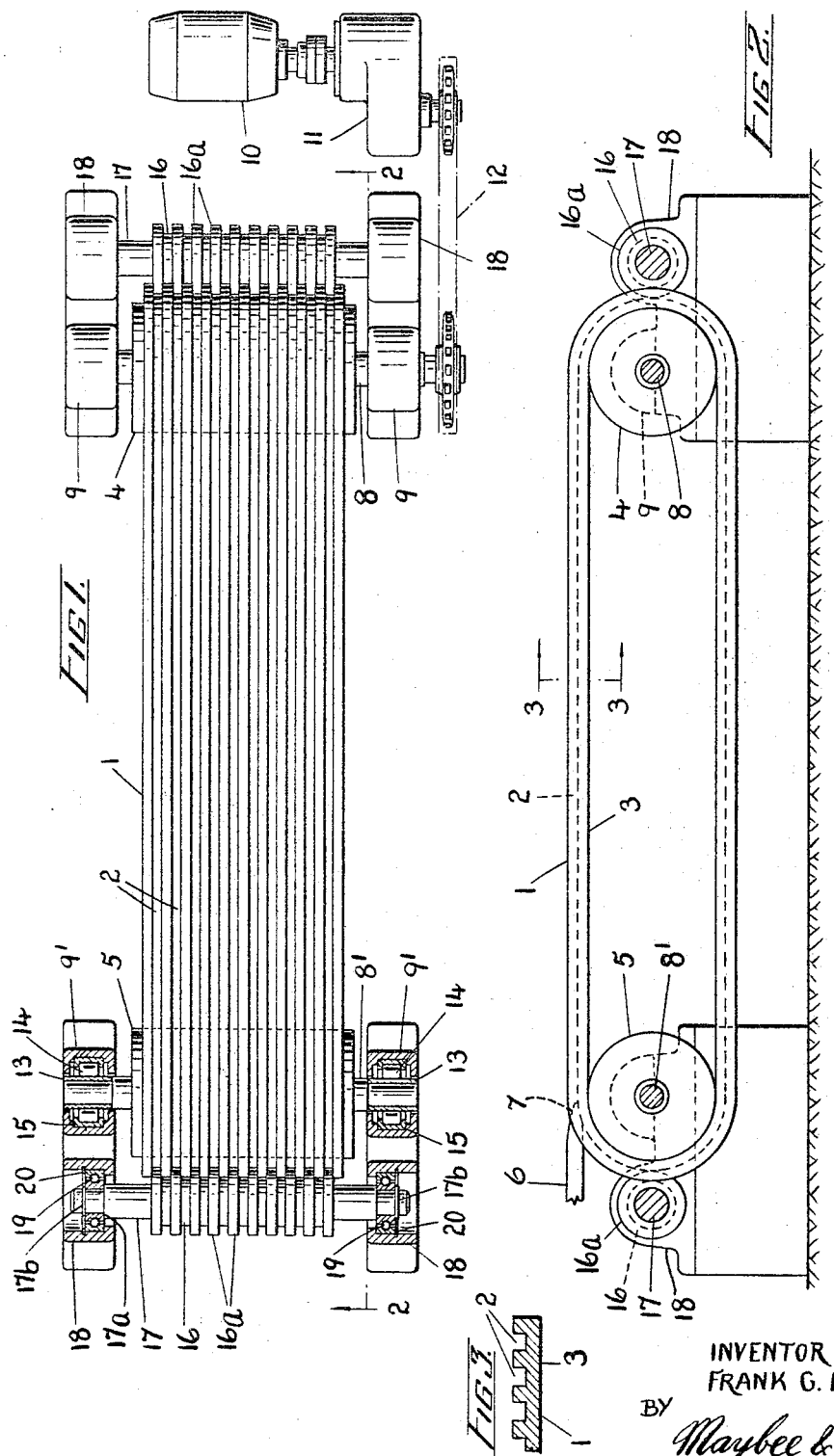
INVENTOR
FRANK G. EAST
BY
Maybee & Legris
ATTORNEYS July 18, 1967 F. G. EAST 3,331,491
BELT POSITIONING APPARATUS FOR GROOVED CONVEYORS
Filed Aug. 23, 1965 2 Sheets-Sheet 2

INVENTOR
FRANK G. EAST
BY
Maybee & Legris
ATTORNEYS

United States Patent Office 3,331,491
Patented July 18, 1967

3,331,491
BELT POSITIONING APPARATUS FOR GROOVED CONVEYORS
Frank George East, Toronto, Ontario, Canada, assignor to Turnbull Elevator Limited, Toronto, Ontario, Canada, a corporation
Filed Aug. 23, 1965, Ser. No. 481,608
5 Claims. (Cl. 198—202)

This invention relates to belt conveyors which have a belt of rubber or other resilient material with longitudinal grooves and ribs on the outer or load bearing surface of the belt. An example of such a conveyor is a moving sidewalk for carrying passengers on the level or up or down a moderate slope. This example will be used in describing the invention.

A belt tends to wander on its drum because of variations in the belt, for example slight difference in the lengths of the two longitudinal edges, or differences in the thickness and strength of the belt throughout its length, and also because of unequal loading caused by more passengers being closer to one edge than the other. To compensate for this tendency the drum is commonly crowned, i.e., it is not perfectly cylindrical but is larger at the middle than at the edges of its belt engaging surface. The crowning of the drum has the effect of causing the belt to center itself on the drum. However, there is always an excursion of the belt axially of the drum during each trip of the belt due to the above-mentioned manufacturing variations and loading.

When the belt is grooved longitudinally to provide a suitable walking or carrying surface, a comb is provided at each end of the belt to remove dirt from the belt grooves and to prevent shoes or other matter from being caught where the belt goes around the drum and disappears below the floor. In prior arrangements the comb has been arranged so that it is free to move from side to side, following the movement of the belt. However the comb may become clogged with foreign matter and refuse to move.

According to the present invention the drum is free to move axially and the belt is restrained from travelling parallel to the drum axis. This eliminates the necessity of providing means for permitting the comb to move sideways, and provides a more stable surface for passengers when they step on or off the belt. Maintaining the belt in its desired running position also results in constant clearances between the edges of the belt and the adjacent structure.

The invention is illustrated by way of example in the accompanying drawings in which:

FIG. 1 is a partly sectional schematic plan view of a belt conveyor, with the combs removed;

FIG. 2 is a sectional view taken along the line 2—2 in FIG. 1 and showing a typical comb;

FIG. 3 is a sectional scrap view taken along the line 3—3 in FIG. 2;

Figure 4:
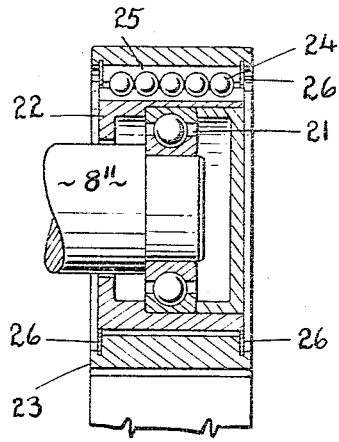
Figure 5:
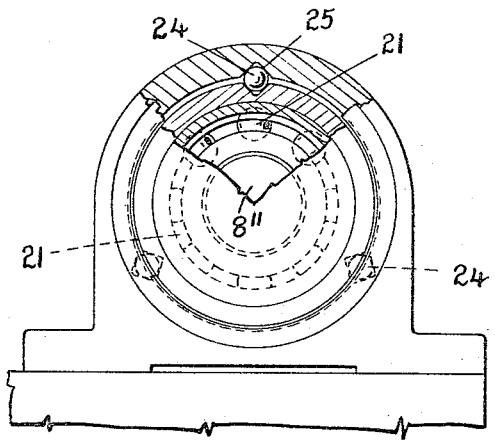
Figure 6:
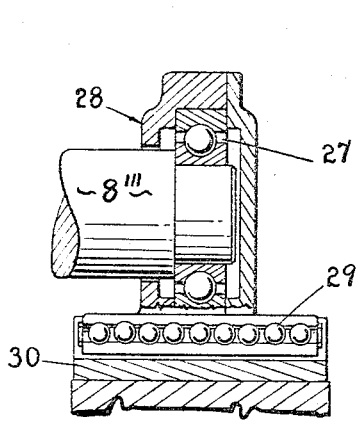
Figure 7:
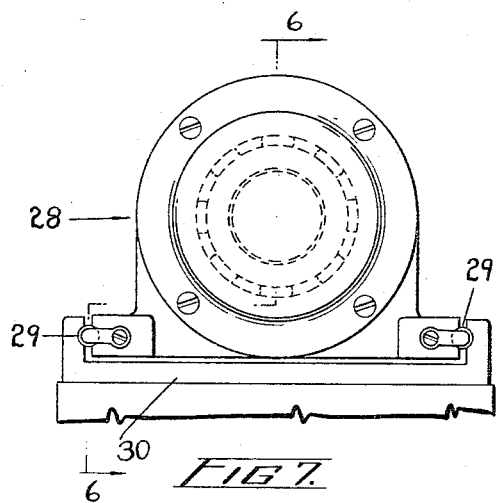

FIGS. 4 and 5 are, respectively, a longitudinal section and a partly sectional end view of a drum mounting that can be used as an alternative to the ones illustrated in FIG. 1; and FIGS. 6 and 7 are, respectively, a sectional and an end view of another alternative drum mounting, the section of FIG. 6 being taken on the line 6—6 of FIG. 7.

The conveyor illustrated in the drawings has an endles belt 1 provided with longitudinal grooves 2 in its load bearing surface, the belt having a smooth reverse surface 3. The surface 3 of the belt runs around a drum 4 at the head or drive end of the conveyor and around a drum 5 at the tail end of the conveyor. Although in FIG. 1 the drums appear to be perfectly cylindrical their surfaces are preferably crowned in the usual manner, but are smooth to facilitate axial movement of the drums relative to the belt. A stationary comb 6 at the tail end of the conveyor has teeth 7 that extend into the grooves 2 of the belt. A similar comb can of course be provided at the head end.

The head drum 4 is mounted for rotation by means of a shaft 8 journalled in pillow blocks 9, the shaft 8 being driven by a motor 10 through a speed reduction unit 11 and chain drive 12. The tail drum 5 is similarly supported by a shaft 8' journalled in pillow blocks 9'. The head and tail pillow blocks 9 and 9' can be provided with bearings that allow linear reciprocation of the associated drum along its rotational axis, and one bearing construction that allows such axial movement is illustrated in FIG. 1 for the mounting of the drum 5. The shaft 8' has, at the ends hardened cylindrical sleeves 13 supported by cylindrical rollers 14 that are restrained against axial movement by outer races 15 fixed in the pillow blocks. The shaft 8' is not, however, restrained against such axial movement. The chain drive 12 allows axial movement of the shaft 8 and drum 4, but of course other types of drive (for example, a spur gear drive) could equally be used as long as it permits such movement.

Because the drums 4 and 5 can move along their rotational axes the belt 1 can be restrained against sidewise movement relative to the teeth 7 of the comb. This restraint can be provided by means of idlers 16 having peripheral ribs 16a that register with several or all of the grooves 2 of the belt. The idlers 16 have mountings that restrain the idlers against axial movement. Thus, each idler 16 has a shaft 17 journalled in pillow blocks 18 on an axis parallel to the axes of the drums 4 and 5. The blocks 18 house ball bearings 19 that are held by split rings 20 against axial movement, and each shaft 17 is prevented from moving axially by a shoulder 17a and collar 17b. The construction illustrated prevents the idlers from moving axially, although other arrangements could obviously be used to prevent such movement of the idlers. Because the ribs 16a of the idlers bear against the flanks of the belt grooves 2 the belt is restrained against wandering from side to side, and the forces which ordinarily would cause belt wander cause, instead, side to side (axial) oscillation of the drums 4 and 5.

As an alternative to the drum mounting provided by the shaft 8' and pillow blocks 9', the construction illustrated in FIGS. 4 and 5 can be used. Here the drum shaft 8″ is rotationally supported in a ball bearing 21 which forms part of an assembly 22 that can reciprocate axially within a fixed housing or base 23, the assembly 22 riding on balls 24 that roll in ways 25 between stops 26. As another alternative, shown in FIGS. 6 and 7, the drum shaft 8‴ can rotate in a ball bearing 27 that forms part of an assembly 28 that is slidable on bearings 29 in ways of a base 30.

Other possible modifications will readily occur to those skilled in the art. For example, although the idler 16 can, as illustrated, be located where they are backed up by the drums 4 and 5, they could be placed below the lower course of the belt 1 and be backed up by rollers (not shown) running against the smooth reverse surface 3.

What I claim as my invention is:

1. A conveyor comprising an endless belt having a longitudinally grooved load bearing surface, the belt also having a smooth reverse surface, a smooth surfaced drum over which the reverse surface of the belt runs, a drum mounting that supports the drum for rotation about its rotational axis, a stationary comb having teeth that extend into the grooves of the belt, and means restraining the belt against sidewise movement relative to said teeth, the drum mounting including means that allow linear reciprocation of the drum along said rotational axis to compensate for the restraint on the belt.

2. A conveyor as claimed in claim 1, wherein the drum mounting comprises a cylindrical drum shaft and axially restrained rollers journalling said shaft, the shaft being free to reciprocate axially with respect to the rollers.

3. A conveyor as claimed in claim 1, wherein the drum mounting comprises a drum shaft, a bearing rotationally supporting the shaft, and a base on which the bearing is free to reciprocate axially.

4. A conveyor as claimed in claim 1, wherein the means restraining the belt against sidewise movement comprise an idler having peripheral ribs registering with grooves of the belt, and an idler mounting that supports the idler for rotation about an axis parallel to that of the drum, the idler mounting including means that restrain axial movement of the idler.

5. A conveyor as claimed in claim 1, including means for rotationally driving the drum while allowing said linear reciprocation of the drum.

References Cited
UNITED STATES PATENTS

| | | | |
|---|---|---|---|
| 1,522,548 | 1/1925 | Schibrowski. | |
| 2,066,307 | 12/1936 | Horton | 74—241 X |
| 3,126,084 | 3/1964 | Sinden | 109—202 X |

EVON C. BLUNK, *Primary Examiner.*

A. C. HODGSON, *Assistant Examiner.*